United States Patent [19]

Gossel

[11] 3,876,945

[45] Apr. 8, 1975

[54] FM-RECEIVER HAVING MEANS FOR INTERFERENCE SUPPRESSION

[75] Inventor: Dieter Gossel, Hamburg, Germany

[73] Assignee: U.S. Philips Corporation, New York, N.Y.

[22] Filed: June 1, 1973

[21] Appl. No.: 366,072

[30] Foreign Application Priority Data

June 9, 1972 Germany............................ 2228069

[52] U.S. Cl................................... 325/348; 325/322

[51] Int. Cl............................................... H04b 1/10

[58] Field of Search............................ 325/322–325, 325/348

[56] References Cited

UNITED STATES PATENTS

| | | | |
|---|---|---|---|
| 3,375,445 | 3/1968 | Salmet | 325/322 |
| 3,678,396 | 7/1972 | Hoffman | 325/322 |

*Primary Examiner*—George H. Libman

*Attorney, Agent, or Firm*—Frank R. Trifari; Henry I. Steckler

[57] ABSTRACT

In frequency-modulated signals, particularly in the frequency-analog measuring technique, only the zero crossings of the signals or the intervals between the zero crossings are evaluated. In order to prevent or at least to reduce interferences which occur meanwhile, the receiver is blocked for a given period after each zero crossing. In order to generate a blocking signal having an optimum duration, the values of the duration of the preceding signal zero crossing intervals are stored individually and the minimum duration to be expected of the next signal zero crossing interval is calculated therefrom. In the same manner the maximum duration to be expected of the next signal zero crossing interval can be determined, at the end of which maximum duration a substitution signal can be applied to the receiver when no zero crossing of the input signal has meanwhile been detected. As a result, the adverse effects of for instance short transmission interruptions can be eliminated.

5 Claims, 3 Drawing Figures

FM-RECEIVER HAVING MEANS FOR INTERFERENCE SUPPRESSION

The invention relates to a receiver for signals, modulated in frequency by a modulating signal, comprising means for blocking said receiver during part of each time interval between successive zero crossings of said modulated signals in accordance with said modulating signal.

It is known that frequency modulation (FM) can be used successfully when information is to be transmitted through channels subject to interference. The greater degree of freedom from interference, however, is obtained at the expense of a bandwidth which is greater than that required for linear modulation methods such as amplitude modulation. A measure for the improvement in signal-to-interference ratio is the modulation index which is the ratio between the peak frequency deviation and the highest modulating frequency. This applies only as long as the interference signals remain small with respect to the FM-signal. Interference signals which lead to additional zero crossings of the FM-signal are particularly annoying. Especially when transmitting measuring values, this type of interference results in transmission errors since in that case demodulation is often effected by counting the zero crossings of the FM-signal in a given time interval or by measuring the time between two or more successive zero crossings.

To improve the output signal-to-noise ratio arrangements are known which block the receiver input during part of each time interval between successive zero crossings of a signal. Interference cannot become effective during the blocking period. In this case useful information is not lost as long as it is ensured that no real zero crossing of the FM-signal occurs during the blocking period. This is the case when the blocking period is shorter than the minumum zero crossing interval to be expected. On the other hand the blocking period is to be slightly shorter than this minimum interval to be expected in order to decrease the probability that an interference signal occurring shortly before the useful signal is evaluated as a useful signal.

An arrangement in which the blocking period is controlled by the modulating signal is known from German Patent Specification No. 809,670. The demodulated signal which may be passed through a lowpass filter is used for this purpose. However, by the demodulation and in particular by a lowpass filter, the separate time intervals between the past zero crossings are averaged and also a certain time shift in introduced so that the optimum blocking period cannot be obtained.

It is an object of the invention to provide a receiver of the kind described in the preamble in which interference is suppressed substantially to a theoretically optimum extent.

The receiver according to the invention is characterized in that said blocking means comprise means for measuring the discrete duration of said zero crossing time intervals and producing a measuring signal representative of said duration, means for storing said measuring signal, means for calculating the expected value of the minimum duration of the next one of said zero crossing time intervals from said stored measuring signal and predetermined modulation data of said modulated signals, and means for producing a blocking signal having a duration substantially equal to said calculated expected value of the minimum duration.

For the theoretically optimum blocking period, the duration of the last preceding time interval between zero crossings is mainly decisive and, to a slighter extent, the duration of some further preceding time intervals between zero crossings of the signal. The optimum blocking period can then be calculated by a discrete evaluation and storage of these durations.

One embodiment of the receiver according to the invention will be described in detail with reference to the drawing.

FIG. 1*a* shows an example of a frequency-modulated signal in which the instantaneous frequency increases with time. only the zero crossings of this signal are used for further evaluation. They are shown as pulses in FIG. 1*b*. The time intervals $T_{n-1}$, $T_n$, $T_{n+1}$ of the zero crossing signal in FIG. 1b decrease with time in accordance with the increasing frequency of the input signal.

Figure 1:
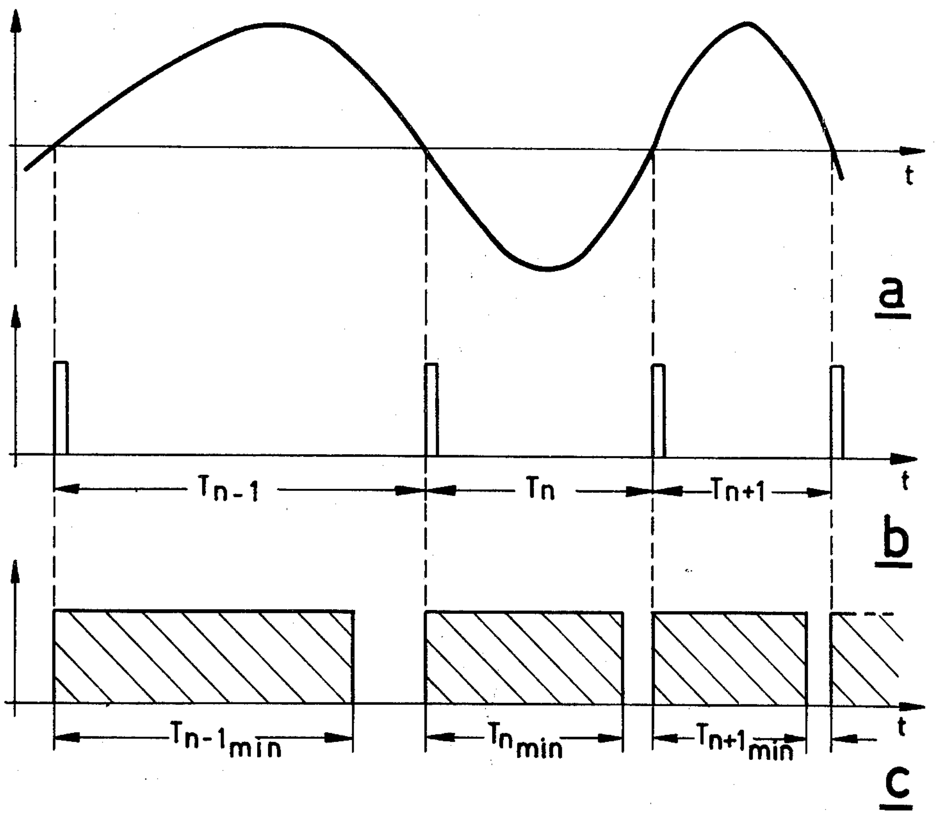
FIG. 1 shows a diagram of an example of a frequency-modulated signal

The expected values of the minimum duration of the time intervals between zero crossings of the input signal are shown in FIG. 1*c*. These minimum durations can be expected on account of the previous behaviour (not shown) of the input signal and the characteristic modulation data of this signal. The blocking period must be slightly shorter than the minimum duration of the next zero crossing interval to be expected, in order that no real zero crossing is lost in extreme cases. In FIG. 1 this slightly shorter time is, however, not taken into account for the purpose of simplicity.

These minimum durations to be expected are, however, ideal values which are obtained when substantially the whole (previous) history of the input signal is taken into account. In practice, this is of course not possible. The same argument also applies to the maximum duration of time intervals between zero crossings that can be expected. A substitution signal can be applied to the receiver when no input signal is receiver during a time interval having the expected maximum duration. On the other hand interference may be effective during the time between the end of the blocking period and the instant of applying a substitution signal to the receiver which signal then initiates a new blocking period. This time is therefore to be as short as possible. It is dependent on the desired degree of freedom from interference in how far the duration of the last time interval between zero crossings and the duration of further preceding zero crossing intervals are to be taken into account in the calculation of the expected values of the minimum and the maximum durations $T_{n+1\,min}$ and $T_{n+1\,max}$ of the next zero crossing interval. When only the duration $T_n$ of the last zero crossing interval is taken into account, the result is $$T_{n+1\,min}\ T_n\ \{1-kT_n^2 + 3\ (kT_n^2)^2\}$$

$$T_{n+1\,max} \approx T_n\ \{1+kT_n^2 + 3\ (kT_n^2)^2\}$$

In these formulae $$k = 2\ \omega_x\ \Delta\ \Omega\ /\ \pi^2$$

where $\omega_x$ is the maximum modulating frequency and $\Delta\ \Omega$ is the peak frequency deviation so that $k$ is determined by the characteristic modulation data. The variation of the duration of the zero crossing interval is thus proportional to the square of the duration of the zero crossing interval itself as well as to the product of maximum modulating frequency and peak frequency deviation.

The interference probability S is a measure of the number of evenly distributed interferences which can become effective, the maximum interference probability $\rho$ 1max occurring at the maximum possible duration of a zero crossing interval and being:

$$\rho\ 1\text{max} \approx 1/\eta\ (1 - 1/\eta\ [2m/1-m]2)$$

In this formula $\eta = \Delta\ \Omega/\omega_x$ and $m = \Delta\ \Omega/\Omega_0$, where $\Omega_0$ is the carrier frequency or the central frequency or the central frequency, $\Delta\ \Omega$ and $\omega_x$ having the same meaning as in the foregoing. The interference probability $\rho_{1max}$ is thus also dependent on the modulation index and may be made arbitrarily small with an increasing modulation index.

The interference probability is essentially smaller when a very small modulation degree is chosen as is common practice, for example, in FM radio broadcasting.

The above method is also suitable for suppressing burst-type interference, if the bursts are shorter than each zero crossing interval of the signal. These bursts occur particularly in transmission channels which are connected by means of switching centers.

Assuming that the first pulse of an interference burst reaches the receiver instead of a real zero crossing and that this first pulse has initiated blocking for the minimum duration of the next zero crossing interval to be expected, the subsequent real zero crossing but also the subsequent pulses of the interference burst will be suppressed. At the end of the zero crossing interval the receiver thus has received the correct number of zero crossings and only a small time shift in the reception of these crossings will result.

Figure 2:
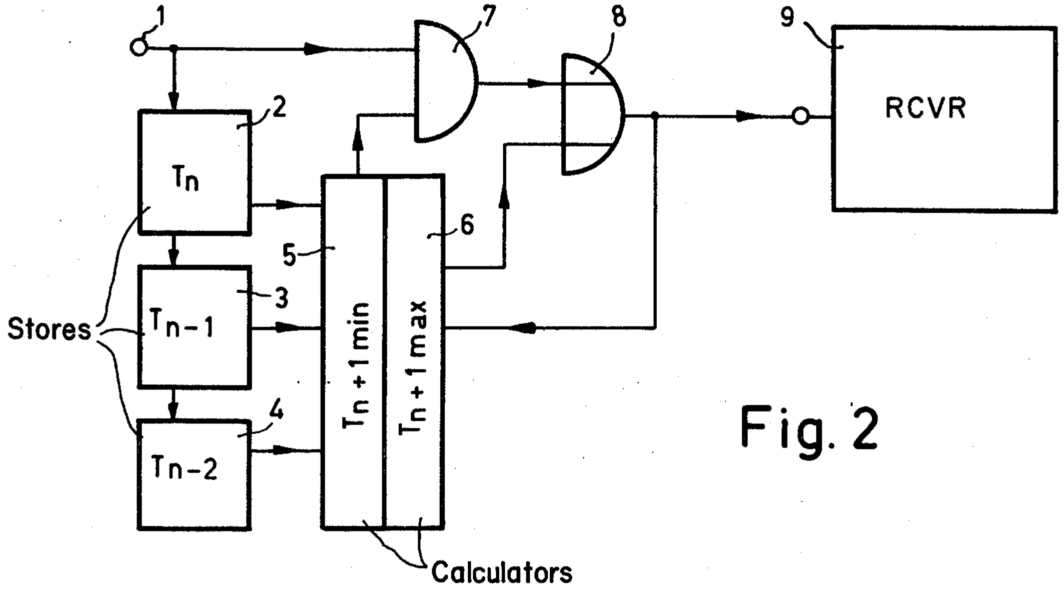
FIG. 2 shows a block-schematic diagram of a receiver according to the invention

FIG. 2 is a block diagram of a receiver according to the invention. Either the input signal shown in FIG. 1a or the zero crossing pulse derived therefrom is applied to the signal input 1. In the former case both the proper receiver 9 and the duration measuring arrangement 2 must be able to generate the zero crossings from the frequency-modulated input signal. The signal applied to the signal input 1 is then passed on through the AND-gate 7 and the OR-gate to the signal input of the proper receiver 9 and is directly applied to the duration measuring arrangement 2. In this measuring arrangement 2 the duration of the signal zero crossing interval just received is measured and at the end of this interval that is to say, at the occurrence of the next zero crossings signal, a measuring signal representative of this duration is stored. The previously stored value of the duration of the preceding signal zero crossing interval is transferred to the store 3 and the value stored therein is transferred to the store 4. If very strict requirements have to be imposed on the interference signal suppression and if the exact theoretical value of the minimum and possibly maximum duration of the signal zero crossing interval to be expected is to be approximated as close as possible, further stores (not shown) may follow the store 4 in which stores the stored values are equally transferred to the next store at each zero crossing. The store in the measuring arrangement 2 as well as the stores 3 and 4 and optionally following stores are therefore appropriately formed by shift registers. If less stringent requirements are imposed on the suppression of interference it may be sufficient to store only the duration of the last zero crossing interval of the signal. In this case the stores 3 and 4 are absent and the value stored in the measuring arrangement 2 store is erased and the next value is written in again.

The outputs of these stores are connected to the calculating unit 5 in which the shortest duration of the zero crossing interval to be expected is calculated, taking account of the known characteristic modulation data. This calculation is effected with known means of the analog and/or digital computer technique, the computer program being given by the mathematic equation for the minimum duration of the signal zero crossing in interval to be expected. These computer means themselves are not within the scope of this invention and are therefore not further described.

After reception of a zero crossing signal which is passed on by the measuring arrangement 2 to the calculating unit 5, this unit generates a blocking signal having a duration which is slightly shorter than the shortest duration of the next signal zero crossing interval to be expected. This blocking signal is applied to the lower input of the AND-gate 7 and it ensures that no signal applied to the signal input 1 can reach the proper receiver 9 during the period of the blocking signal.

The outputs of the store in measuring arrangement 2 and of stores 3 and 4 are also connected to a calculating unit 6 in which in a corresponding manner as in calculating unit 5 the longest duration of the next zero crossing interval to be expected to calculated. When no further zero crossing signal has reached calculating unit 5 until this maximum duration is finished, calculating unit 6 generates a substitution signal which is applied through the OR-gate 8 to the receiver 9 so as to bridge a possibly short-lasting transmission interruption with a small error only. In addition a new blocking signal is released in calculating unit 5 by means of the substitution signal and this is appropriately effected with the aid of the stored values already available. An alarm may be provided when calculating unit 6 must supply a substitution signal one or several times after each other so as to recognize an interruption in the transmission or a drop-out of the transmitter or to avoid that the receiver synchronization is lost.

The blocking signal is generated by means of timing signal generator comprising means for controlling the natural duration of its timing signal; the same applies to the generation of the substitution signal. These timing signal generators are controlled by the calculated values of the minimum and maximum durations of the signal zero crossing interval to be expected. The structure of the timing signal generators is especially dependent on the frequency range and on the desired degree of interference reduction. Alternatively, digital counter circuits may be used. In case of a very small modulation degree and a very high frequency as is common practice in, for example, FM radio broadcasting, the blocking signal and the substitution signal are not directly supplied by a trigger circuit but by a frequency heterodyning circuit.

Figure 3:
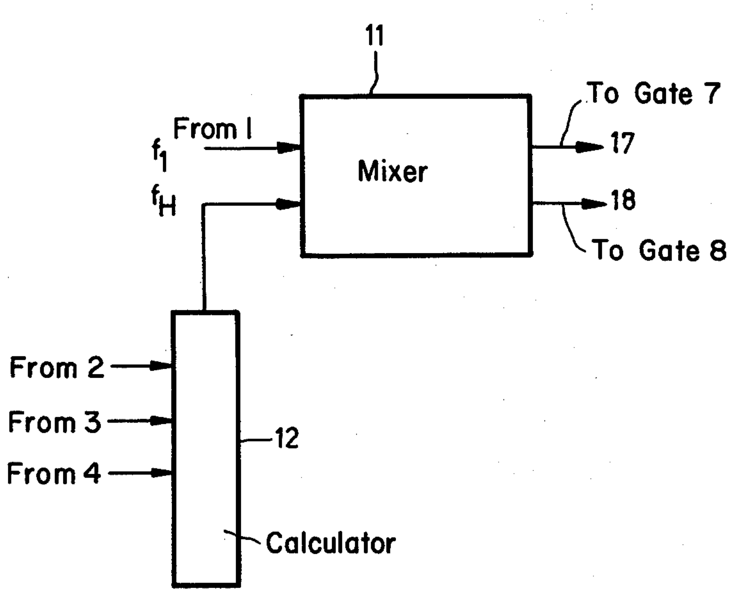
FIG. 3 shows an arrangement for generating the blocking signal.

Such a heterodyne circuit is diagrammatically shown in FIG. 3. The input signal of the frequency $f_1$ and an auxiliary signal of the frequency $f_H$ are applied to the mixer or modulator circuit 11. The auxiliary signal is controlled by a calculating unit 12 which may be constructed and controlled in the same manner as calculating unit 5 and 6 of FIG. 2. In mixer circuit 11 the sum of the two input frequencies is formed, which sum signal is derived from the output 17 and determines the blocking signal, and likewise the difference between the two input frequencies is formed, which difference signal is derived from the output 18 and determines the substitution signal.

What is claimed is:

1. A receiver for signals modulated in frequency by a modulating signal, comprising means for blocking said receiver during part of each time interval between successive zero crossings of said modulated signals in accordance with said modulating signal, characterized in that said blocking means comprise means for measuring the discrete duration of said zero crossing time intervals and producing a measuring signal representation of said duration, means for storing said measuring signal, means for calculating the expected value of the minimum duration of the next one of said zero crossing time intervals from said stored measuring signal and predetermined modulation data of said modulated signals, and means for producing a blocking signal having a duration substantially equal to said calculated expected value of the minimum duration.

2. A receiver as claimed in claim 1, characterized in that said calculating means are arranged for calculating said expected value of the minimum duration from said predetermined modulation data and only the stored measuring signal of the last preceding zero crossing time interval.

3. A receiver as claimed in claim 1, characterized in that said blocking means comprise additional means for calculating the expected value of the maximum duration of the next one of said zero crossing time intervals from said stored measuring signal and said predetermined modulation data, and means for producing a substitution receiver input signal in response to the absence of a next zero crossing of said modulated signals during a time interval equal to said calculated expected value of the maximum duration.

4. A receiver as claimed in claim 1, characterized in that said means for producing a blocking signal comprise a source of auxiliary signals, means for varying the frequency of said auxiliary signals in accordance with said calculated expected value of the minimum duration, a mixer circuit having inputs for receiving said modulated signals and said auxiliary signals, respectively, to produce an output signal having a frequency equal to the sum of the mixer input signal frequencies, and means for deriving said blocking signal from said mixer output signal.

5. A receiver as claimed in claim 3, characterized in that substitution signal producing means comprise a source of auxiliary signals, means for varying the frequency of said auxiliary signals in accordance with said calculated expected value of the maximum duration, a mixer circuit having inputs for receiving said modulated signals and said auxiliary signals, respectively, to produce an output signal having a frequency equal to the difference of the mixer input signal frequencies, and means for deriving said substitution signal from said mixer output signal.

* * * * *